Jan. 4, 1966   D. LANGFORD ETAL   3,227,585
FUEL CELL
Filed Nov. 7, 1960
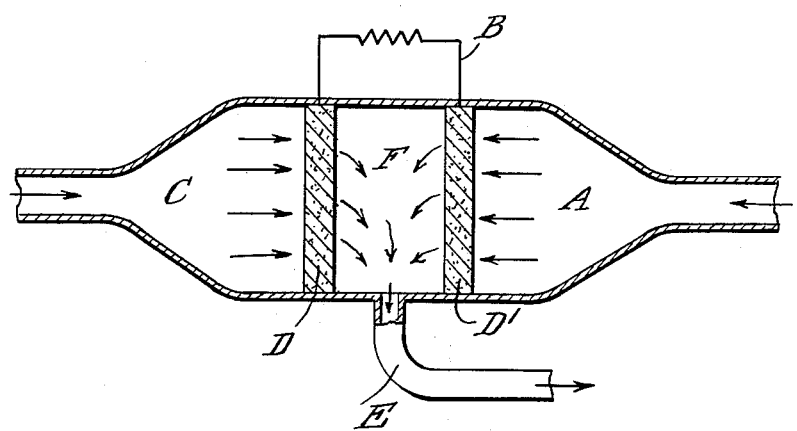
INVENTOR
David Langford
A. Walter Stubner
BY
Watson, Cole, Grindle & Watson
ATTORNEYS

United States Patent Office 3,227,585
Patented Jan. 4, 1966

3,227,585
FUEL CELL
David Langford, Manchester, and Alfred W. Stubner, Glastonbury, Conn., assignors, by mesne assignments, to Leesona Corporation, Cranston, R.I., a corporation of Massachusetts
Filed Nov. 7, 1960, Ser. No. 67,783
5 Claims. (Cl. 136—86)

This invention relates to an improved fuel cell and more particularly to a fuel cell wherein the oxidant and fuel are both contained in a liquid electrolyte.

"Fuel cell," as the term is used in this specification, is an electrochemical cell in which the free energy of combustion of the fuel is converted directly into electrical energy. The cell in its simplest concept comprises a housing, an oxidizing electrode, a fuel electrode and an electrolyte. As the fuel and oxidant are passed through or in contact with their respective electrodes, they are adsorbed in the pores and de-adsorbed in the form of ions leaving the electrodes electrically charged. Thus, in the case of an oxygen-hydrogen fuel cell, oxygen gas is adsorbed and de-adsorbed as oxygen ions, leaving the oxygen electrode positively charged and at the fuel electrode, hydrogen gas is adsorbed and de-adsorbed as hydrogen ions, leaving the electrode negatively charged. The electric current is drawn off through an external route.

In the recent prior art, the fuel and oxygen electrodes of the cell were customarily constructed as hollow bodies with the outer surface maintained in contact with the electrolyte and the fuel and oxidant, respectively, being passed into the hollow interior of the electrode. Alternatively, they were constructed so that one surface of the electrode was maintained in contact with the electrolyte while the fuel and oxidant were passed on one side or caused to come in contact with the other surfaces.

However, while fuel cells utilizing such electrodes, particularly where the electrode structures are bi-porous, have been found to be considerably more efficient than a heat engine which is limited to about a 38% output by the Carnot cycle, they are still capable of improvement and, thus, the object of concentrated research. It has been found, for example, that bi-porous electrodes are relatively expensive and difficult to produce and that it is necessary to construct the fuel cell so that the oxidizing and fuel gases are not blown through the electrodes unconsumed. This necessitates a critical balancing of the pressure of the gases employed with the surface tension exerted by the electrolyte in order to establish a three-phase interface within the electrode where the reactions occur. Further, if the oxidant escapes unused into the electrolyte, it can migrate to the fuel electrode, oxidizing the electrode and rendering the cell relatively inefficient. Another disadvantage occurs in that it is practically impossible to obtain fuels which are completely pure, thus, inert gases often collect in the pores of the electrode, thus blocking those pores and limiting their availability for reaction.

Accordingly, it is an object of the instant invention to provide new and improved fuel cells which avoid to a substantial degree these problems.

It is another object of the invention to provide a fuel cell which minimizes the change of the fuel cell resistance with time.

It is a further object of the invention to provide a fuel cell wherein the electrolyte remains substantially invariant.

It is a further object of the invention to provide a fuel cell wherein the reaction area of the electrodes of a given size is substantially greater than in the prior art.

It is still a further object of the invention to provide an improved fuel cell wherein the cell utilizes an electrolyte having gas bubbles entrained in the electrolyte.

It is still a further object of the invention to provide a method of constructing an improved fuel cell. These and other objects of the invention will be seen from the following detailed description with particular reference being directed to the drawing and specific illustrative example.

According to the instant invention, the fuel and oxidant are carried directly in the electrolyte and are caused to contact the porous electrode by suitable means. Within the electrodes, a process of adsorption and de-adsorption occurs generating an electromotive force which is used to drive an electrical current through an external load resistance. In one embodiment of the invention the electrolyte carrying the fuel and oxidant, after it has contacted the electrodes and thus has been diluted by reaction products, is removed from the fuel cell by suitable means and if desired purified and recirculated.

A fuel cell, characterizing the instant invention is illustrated in the drawing. Referring to the drawing, a concentrated electrolyte solution carrying oxygen is pumped into area A and a concentrated electrolyte carrying the fuel gas is pumped into area C. By gravitational flow or suitable pressure control means, the electrolyte and fuel are caused to pass through the porous electrode D where a process of adsorption and de-adsorption of the fuel occurs leaving the electrode negatively charged and resulting in the formation of hydrogen ions, in the case of hydrogen as the fuel. At the oxidizing electrode the oxidant is adsorbed and de-adsorbed as oxygen ions leaving the electrode positively charged. Electric current is drawn from the cell by means of external route B. The hydrogen and oxygen ions unite in the electrolytic solution in the area F producing water. The diluted electrolyte is thereafter removed from the fuel cell through outlet E.

The fuel cells of the instant invention provide forced movement of the reactants to the reaction zone as well as the continuous removal of reaction products minimizing the possibility of change in the fuel cell resistance with time. As it is apparent, since the electrolyte is continuously swept from one surface of an electrode to the opposite surface, there is no possibility of pores in the electrode becoming blocked with inert gases which possibly are contained in the fuels. Since the electrolyte, as well as the fuel and oxidant, is passed through the electrodes, there is no need to balance the pressure of the fuel with the surface tension of the electrolyte. The three-phase interface between the reactants, electrolyte and electrode is maintained automatically by passing the electrolyte and the fuel and oxidant through the electrode. As is immediately apparent, the reaction area of a given electrode is substantially greater than in the conventional prior art fuel cell system inasmuch as all of the electrode surface area is effectively utilized in catalyzing the reaction. In prior art systems, only a small portion of the electrode i.e., the area at the three-phase interface, can be effectively used.

In addition to utility in the conventional fuel cell applications, the instant invention is particularly applicable for the generation of electrical current in space. In space applications hydrogen and oxygen gases used to operate the power system are produced in an electrolytic cell wherein the gases are entrained as bubbles in an aqueous potassium-hydroxide solution. One side of the electrolytic cell produces oxygen entrained in a potassium-hydroxide solution as bubbles and the other side produces hydrogen, also entrained in the potassium-hydroxide solution as bubbles. In a conventional fuel cell it is necessary before use to separate the gases from the potassium-hydroxide solution. As is apparent the separation requires power which is a rare commodity in space. In addition, separation of electrolized gases is extremely difficult because of the smallness of the bubbles in the KOH solution.

In the present cell, since it is possible to pump mixtures or solutions of hydrogen in a liquid into one end of the cell and mixtures or solutions of oxygen and a liquid into the other end of the cell with the liquid acting as the electrolyte, separation is not required. Thus, as is apparent, space applications constitute an outstanding potential use of the instant fuel cells.

It has been found that the instant fuel cells can be operated with substantially any liquid electrolyte. As is known in the prior art, for an efficient fuel cell it is necessary that the electrolyte remain substantially invariant and have a high ionic conductivity. These properties are desirable in the instant fuel cell, however, since the electrolyte is constantly removed from the reaction zone and recirculated, the requirement that the electrolyte undergo no chemical change through reaction with the fuel or oxidant is not so critical as in conventional cells. Aqueous alkali metal hydroxides such as potassium and sodium hydroxides are particularly suitable. Operable cells can be constructed utilizing aqueous alkali metal hydroxide solutions in the range of from about 8–55%. It is only necessary that the electrolyte be relatively fluid and not corrode the mechanical hardware of the cell. The selection of the proper concentration of the electrolyte is within the ability of one skilled in the art. In addition to the alkali metal hydroxides, aqueous carbonates, alkanolamines, etc. may be employed. The alkanolamines, for example, have been found to be particularly suitable for use in the cell when carbonaceous fuels are employed because of their ability to absorb carbon dioxide which may be liberated as a reaction product. Other liquids which are ionic conductors can be substituted for the materials mentioned above.

In the instant fuel cells, carbonaceous fuels such as carbon monoxide, methanol, methane, propane and kerosene vapors have been found to be particularly advantageous, however, other fuels, such as hydrogen, can be employed. In the fuel cells of the instant invention, while in one preferred embodiment the fuel and oxidant are merely entrained as bubbles in the electrolyte, it is possible to utilize fuels and oxidants which are dissolved or dispersed in the electrolyte. Therefore, it is possible to use fuels which are liquids at ordinary temperatures such as ethyl alcohols, ethyl acetates, metyl ethyl ketone, and diethyl ether. Basically, any liquid material containing only carbon, oxygen and hydrogen in the molecule has been found to be operable. Inasmuch as the electrolyte is constantly being passed through the porous electrode, fuels which contain impurities can be employed since there is little or no danger of the electrode pores becoming plugged or blocked. In addition solid fuels can be used in the instant cells as well as liquid and solid oxidants.

Porous electrode structures known in the prior art can be employed in fuel cells of the present invention. Electrodes having a suitable substrate such as carbon, aluminum silicate, or alumina activated with a catalytic metal from Group 8 of the Periodic Table have been employed. Alternatively, electrodes made by sintering pure metallic powders have been found to have outstanding characteristics. However, such electrodes are relatively expensive and therefore are not practical for low cost units. The catalytic metals useful for activating carbon substrates, etc. or for producing sintered metal electrodes are platinum, palladium, neodymium, nickel, cobalt, rhodium, ruthenium, iron, copper, gold, silver, cadmium, zinc, chromium, and molybdenum. The proper selection of a suitable electrode depends to a substantial extent upon the fuel employed as well as the ultimate application of the cell. A proper selection of the electrodes is within the ability of one skilled in the art.

The usual range of operating temperatures of the instant cells is from about 20–240° C. However, it has been found that the cells can be operated at temperatures as high as 250–300° C. and above. The temperature to a large extent depends upon the fuel and electrolyte employed. As a general rule, the higher the temperature, the greater the electrochemical reaction for a given time.

Having described the invention, the following example is set forth as a working embodiment of the invention.

EXAMPLE

A fuel cell is constructed having a housing substantially the same as the one shown in the drawing and utilizing a sintered porous nickel fuel electrode and as the oxidizing electrode, a porous carbon plate activated with metallic silver. A 27% solution of potassium hydroxide containing hydrogen bubbles entrained in the electrolyte is pumped into area C, and a 27% aqueous solution of potassium hydroxide containing oxygen bubbles entrained therein, is pumped into area A. The electrolyte with the entrained gas bubbles flowed through the electrodes where a process of adsorption and de-adsorption occurred leaving the electrodes electrically charged and releasing hydrogen and oxygen ions. The spent electrolyte containing reaction products is removed from the cell through outlet E. The electrolyte is purified and recirculated.

The cell, operated at 25° C. and at atmospheric pressure, will generate 200 amps current per square foot of electrode area for extended periods of continuous operation, without exhibiting any substantial change in resistance.

In the fuel cells of the instant invention, the electrolyte containing the fuel and oxidizing gas can be mobilized in the unit by gravitational force, by exertion of pressure upon the materials, or by a suitable process of mechanical pumping. The proper selection depends upon the application of the fuel cell and available space and materials. The selection is within the ability of one skilled in the art.

It should be appreciated that the instant invention is not to be construed as being limited by the illustrative example. It is possible to produce still other embodiments without departing from the inventive concept herein disclosed. Such embodiments are within the ability of one skilled in the art.

What is claimed is:

1. A method of generating electrical energy directly from a fuel and oxidant in a fuel cell comprising a housing and a pair of porous electrodes, said electrodes defining a chamber between said electrodes within said housing, said method comprising the steps of (1) admixing fuel with electrolyte; (2) admixing oxidant with electrolyte; (3) continuously passing said fuel-electrolyte admixture through said porous fuel electrode, into said chamber; (4) continuously passing said oxidant-electrolyte admixture through said porous oxidizing electrode, into said chamber; and (5) continuously removing depleted electrolyte from said chamber.

2. The method of claim 1 wherein the fuel and oxidant are entrained in the electrolyte as bubbles.

3. The method of claim 1 wherein the fuel and oxidant are dissolved in the electrolyte.

4. The method of claim 1 wherein the fuel and oxidant are emulsified in the electrolyte.

5. The method of claim 1 wherein the electrolyte is an aqueous solution of potassium hydroxide.

References Cited by the Examiner
UNITED STATES PATENTS

| | | | |
|---|---|---|---|
| 963,852 | 7/1910 | Benko | 136—86 |
| 2,925,454 | 2/1960 | Justi et al. | 136—86 |

ALLEN B. CURTIS, *Primary Examiner.*

JOHN H. MACK, JOHN R. SPECK, *Examiners.*